United States Patent [19]

Clary

[11] 4,133,221

[45] Jan. 9, 1979

[54] RACK GEAR AND METHOD OF MAKING THE SAME

[75] Inventor: Harry E. Clary, Sterling Heights, Mich.

[73] Assignee: TRW, Inc., Cleveland, Ohio

[21] Appl. No.: 809,389

[22] Filed: Jun. 23, 1977

[51] Int. Cl.² .......................... B62D 1/20; F16H 1/04; B21D 53/28; B21H 5/00

[52] U.S. Cl. .................................... 74/498; 29/159.2; 74/422

[58] Field of Search ................. 74/498, 422, 492, 485; 29/159.2

[56] References Cited

U.S. PATENT DOCUMENTS

| | | | |
|---|---|---|---|
| 2,041,376 | 5/1936 | Schmidt | 29/159.2 X |
| 3,163,925 | 1/1965 | Ulm | 29/159.2 |
| 3,593,593 | 7/1971 | Bradshaw | 74/498 |
| 3,753,378 | 8/1973 | Bishop | 74/498 X |

*Primary Examiner*—Leonard H. Gerin

[57] ABSTRACT

An improved vehicle steering apparatus includes a lightweight hollow rack gear. The rack gear has a plurality of hollow teeth which engage a pinion gear in the steering assembly. In order to provide a variable ratio steering apparatus, the pitch of the teeth of the rack gear varies along the length of the gear. The rack gear is made by utilizing a pair of dies to form hollow gear teeth in a side wall of the tubular member. In forming the rack gear, one die is inserted into the tubular member while the other die is placed outside the tubular member with its teeth aligned with recesses between the teeth of the die inside the tubular member. The two dies are then pressed together. To form rack gear teeth with different pitches, the dies are provided with teeth of different pitches.

21 Claims, 13 Drawing Figures

U.S. Patent  Jan. 9, 1979  Sheet 1 of 4  4,133,221
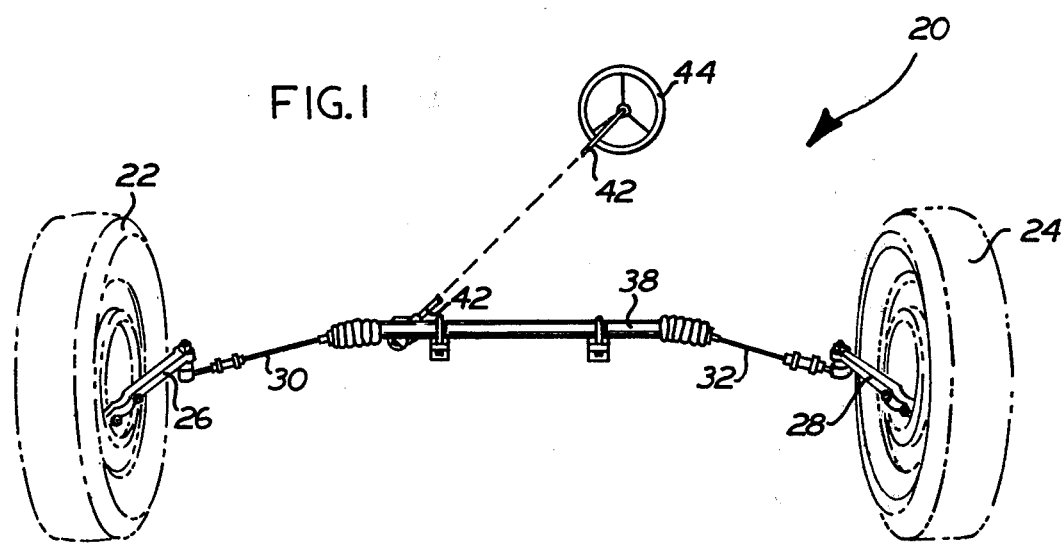
FIG.1
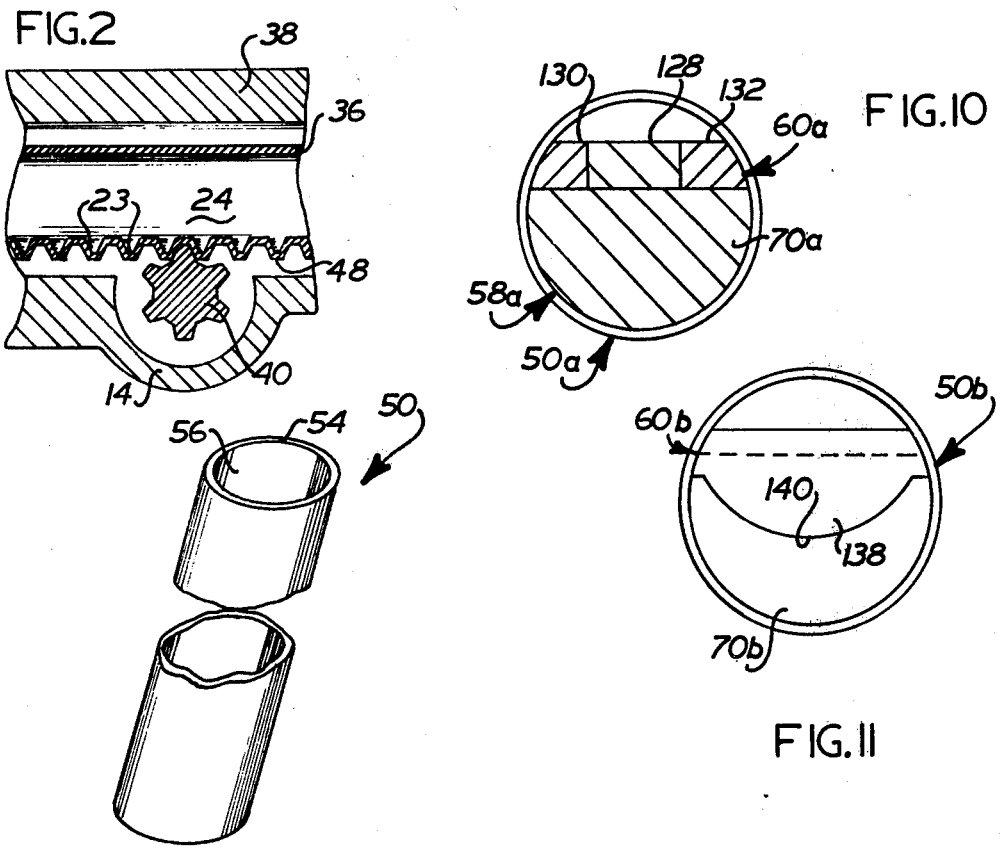

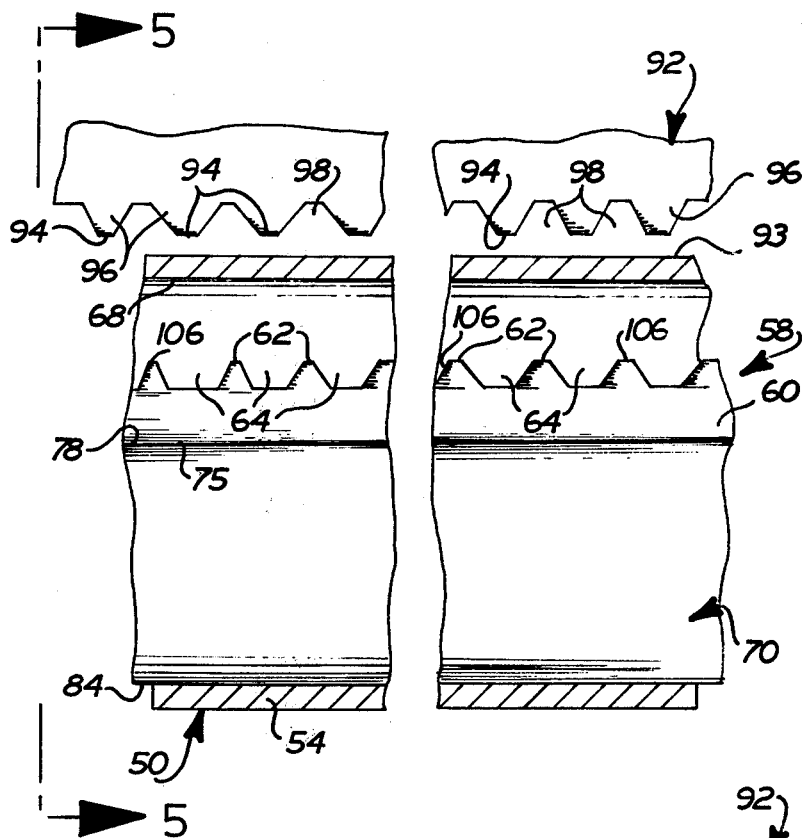
FIG.4
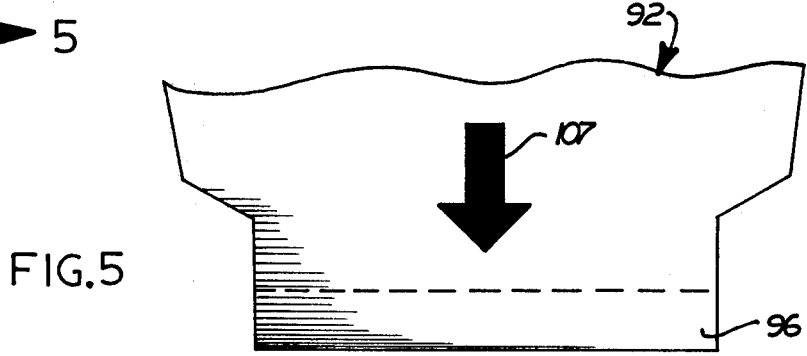
FIG.5
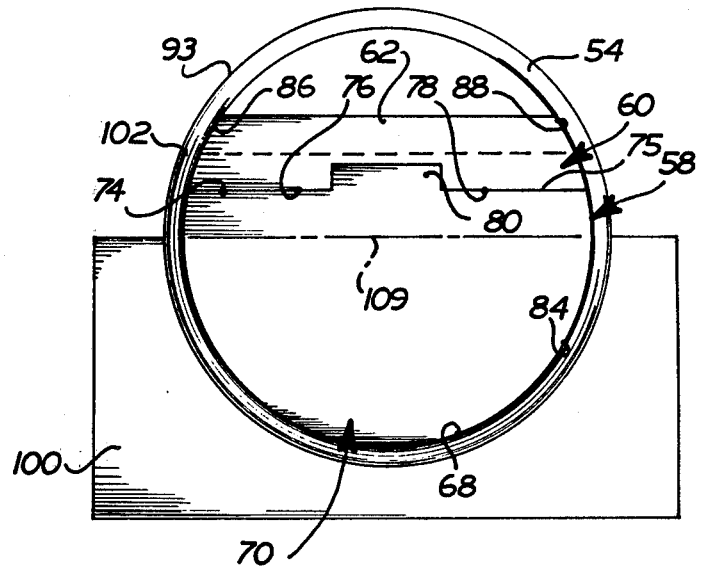

RACK GEAR AND METHOD OF MAKING THE SAME

BACKGROUND OF THE INVENTION

1. Field of Invention

The present invention concerns a new and improved rack gear, and, more specifically, a hollow rack gear.

2. Discussion of Prior Art

Both manual and power assisted vehicle steering systems have used rack and pinion gears in a manner similar to that disclosed in U.S. Pat. Nos. 3,661,032; 3,693,999; and 3,709,099. The advantages of a variable ratio steering gear has been recognized (see U.S. Pat. Nos. 2,973,658; 3,064,491; and 3,267,763). These patents show variable ratio rack and pinion gear steering systems. Varying ratios have been achieved by using a gear set having variable effective pitches. The effective pitch of the rack and pinion gears can be changed by either assembling a plurality of gears in the manner disclosed in U.S. Pat. No. 2,973,658 or performing relatively expensive machining operations to form rack and/or pinion gears with a non-uniform tooth form as shown in U.S. Pat. Nos. 3,064,491 and 3,267,763.

Some of the difficulties in forming nonstandard rack gears for variable ratio steering assemblies, can be overcome by using a helical pinion gear and a rack gear having non-uniform tooth form (see U.S. Pat. No. 3,753,378). However, making a rack gear having non-uniform teeth that will mate with a helical pinion and provide a smooth variation in the gear ratio is difficult.

Additionally, known variable ratio rack and pinion steering systems have relatively heavy solid, rack gear bars. The teeth were solid and formed by metal cutting, forging or casting. The weight of a solid rack gear bar can impose substantial forces on supporting bearings, and steering linkage components when accelerated due to movement of the vehicle over a rough road or other causes. Often these forces are transmitted to the operator. Obviously, such forces can cause wear in the steering system and injury to the operator. Some rack gear bars have included a hydraulic oil passage located along the central axis thereof. Nevertheless, these bars have relatively heavy teeth and side walls which contribute to the overall weight of the rack gear.

SUMMARY OF THE PRESENT INVENTION

The present invention provides a hollow rack gear having hollow teeth. The rack gear is formed from a tubular member. Although the hollow rack gear can be used in different applications, it may be advantageously used in a vehicle steering system. A hollow rack bar provides a substantial reduction in weight of the steering system. Indeed, a hollow rack gear weighs 40 to 60 percent as much as a representative solid rack gear presently used in a commercially available rack and pinion steering assembly. Additionally, hollow rack gears can readily be made with teeth having different pitches so that the rack gear can advantageously be used to provide a variable ratio vehicle steering system.

Accordingly, it is an object of this invention to provide a new and improved hollow rack gear having hollow teeth formed in the wall of a tubular member.

Another object of this invention is to provide a new and improved vehicle steering apparatus which includes a hollow tubular rack gear.

Another object of this invention is to provide a new and improved method of making a hollow rack gear from a tubular member positioning a first toothed die inside the tubular member, aligning a complementary toothed die outside of the tubular member, and closing the dies.

A further object of this invention is to provide a new and improved method of making a rack gear for use in a variable ratio gear set, beneficially the variable ratio gear set may be used in a vehicle steering system; and, wherein the method includes providing a first die having teeth of different pitches, providing a second complementary die, and closing the two dies to form a hollow rack gear having teeth with different pitches in a longitudinally extending wall of the tubular member.

BRIEF DESCRIPTION OF THE DRAWINGS

The foregoing and other objects and features of the present invention will become more apparent upon a consideration of the following description taken in connection with the accompanying drawings wherein:

FIG. 1 is a schematic illustration of a vehicle steering system of the rack and pinion type which may be constructed with a hollow rack gear made in accordance with the present invention;

FIG. 2 is an enlarged sectional view illustrating a pinion gear meshingly engaged with a hollow rack gear in the vehicle steering system of FIG. 1;

FIG. 3 is a partially broken view of a tubular member or blank used to form the hollow rack gear of the vehicle steering system illustrated in FIGS. 1 and 2;

FIG. 4 is an enlarged, partial, sectional view, showing a pair of dies on which teeth have been formed positioned relative to the tubular member of FIG. 3 to form a hollow rack gear;

FIG. 5 is a view taken along the line 5—5 of FIG. 4 and schematically illustrating how the dies in a closed position form a rack bar with hollow gear teeth in a wall of the tubular member of FIG. 3;

FIG. 10 (on the first sheet of drawings) is a sectional view showing the construction of a second embodiment of a die which can be used in forming rack gears of FIGS. 7-9 in the manner illustrated in FIGS. 4-6;

FIG. 11 (on the first sheet of drawings) is a sectional view of a third embodiment of a die which may be used to form rack gears of FIGS. 7-9;

DESCRIPTION OF SPECIFIC PREFERRED EMBODIMENTS OF THE INVENTION

Figure 6:
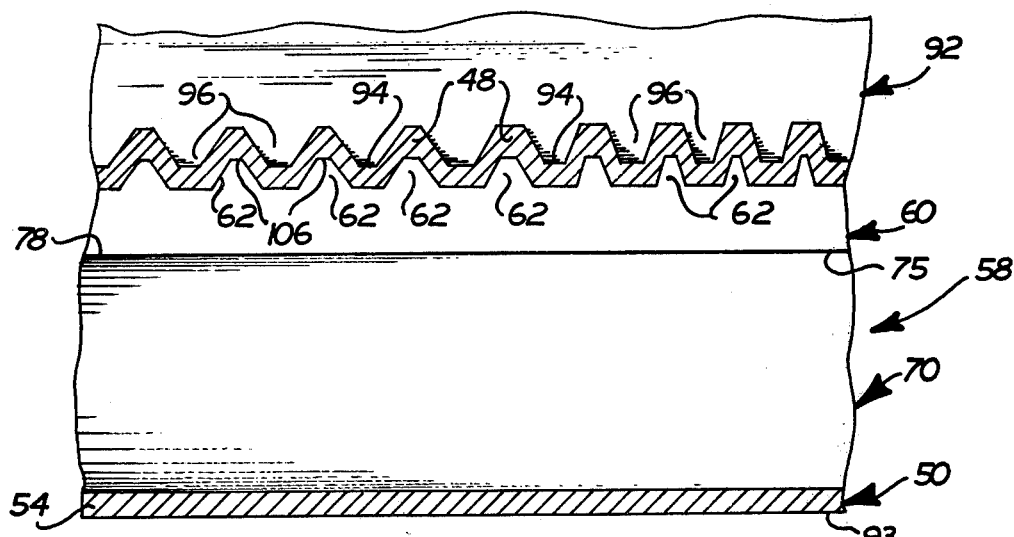
FIG. 6 is a partial sectional view, similar to FIG. 4, showing how the teeth on one die force the tubular member into recesses between teeth on the other die when the dies are closed.

A manually actuated vehicle steering system 20 for steering dirigible wheels 22 and 24 is illustrated in FIG. 1. The vehicle steering system 20 includes a pair of brackets 26 and 28 fixedly connected to the wheels 22 and 24 and pivotally connected with tie rods 30 and 32. The tie rods 30 and 32 are pivotally connected with opposite ends of a rack gear 36 (FIG. 2) in a manner which can be similar to that disclosed in U.S. Pat. No. 3,693,999.

The rack gear 36 is disposed within a cylindrical housing 38 which also encloses and supports a rotatably mounted pinion 40 (FIG. 2). The pinion 40 is connected to a steering shaft 42 (FIG. 1) which is in turn connected to a manually rotated steering wheel 44. As is commonly understood, rotation of the steering wheel 44 causes the pinion 40 to rotate and move the rack gear 36. The movement of the rack 36 pivots steerable vehicle wheels 22 and 24 about generally vertical axes. Although the pinion 40 is shown with straight teeth, i.e., is a spur gear, it is contemplated that the pinion may have helical teeth.

The rack gear 36 (FIG. 2) is hollow to minimize the mass of the rack gear. By reducing the mass of the rack gear 36, the acceleration forces applied to gear supports, steering linkage components and through the steering assembly to the operator when the vehicle wheels 22 and 24 encounters an obstacle tending to divert the steered wheels from straight line travel are also reduced. Additionally, reducing the mass of the rack gear 36 tends to reduce the inertia forces which must be overcome during rapid turning movements.

The rack gear 36 has hollow teeth 48 which are formed in an array in a wall of a tubular metal blank 50 (FIG. 3). The tubular blank 50 may be cylindrical. Its wall 54 defines an open ended cavity 56. Forming the teeth in the tubular member 50 comprises moving a first die assembly 58 through an open end of the blank 50 into the chamber 56, shown in FIGS. 4 and 5. The die assembly 58 includes a longitudinally extending die member 60 having a linear array of outwardly projecting teeth 62 (FIG. 4). Teeth 62 are separated from each other by recesses 64.

Die member 60 is supported with the teeth 62 adjacent to a cylindrical inner surface 68 of the wall 54 by a longitudinally extending support member 70 (see FIGS. 4 and 5). The support member 70 has flat upper side surfaces 74 and 75 (FIG. 5) which engage flat lower side surfaces 76 and 78 of the die member 60. A tongue and groove joint 80 is provided between the die member 60 and support member 70 to prevent relative sidewise movement therebetween. A circular outer surface 84 of the support member 70 is positioned in abutting engagement with the cylindrical inner surface 68 of the tubular blank 50. It should be noted that the sides of the die member 60 are arcuately curved at 86 and 88 to correspond to the curvature of the side wall 54 of the blank 50.

A second or outer die 92 (FIGS. 4 and 5) is positioned adjacent to a cylindrical outer surface 93 of the tubular blank 50. The crests 94 of downwardly projecting teeth 96 on the die 92 are aligned with the recesses 64 between the upwardly projecting teeth 62 on the inner die member 60. Crests 106 of the teeth 62 on the inner die 60 are aligned with recesses 98 between the teeth 96 on the outer die 92. A longitudinally extending support block 100 engages a cylindrical outer side surface 93 of the tubular member 50 to support the tubular member and the inner die assembly 58 in the manner shown in FIG. 5.

To form the rack gear teeth, the upper die 92 is moved downwardly (as indicated by the arrow 107 in FIG. 5) from the position illustrated in FIG. 4 to the position shown in FIG. 6. As the two dies 60 and 92 are closed, the crests 94 on the teeth 96 of the upper die 92 press the side wall 54 of the tubular blank 50 into the recesses 64 between the teeth 62 of the inner die 60. Similarly, the crests 106 of the teeth 62 on the inner die 60 press the side wall 54 into the recesses 98 between the teeth 96 on the outer die 92. This results in the formation of a linear array of hollow rack gear teeth in the side wall of the tubular member 50. Hence, a hollow rack bar with hollow gear teeth has been formed.

Removal of the die assembly 58 from the tubular member 50 after the hollow rack gear teeth have been formed, initially comprises moving the support member 70 axially through an open end of the tubular member 50. As the longitudinally extending upper surfaces 74 and 75 of the support member 70 move clear of the longitudinally extending lower surfaces 76 and 78 on the inner die member 60, the inner die member 60 is free to move downwardly from the position shown in FIG. 6. Hence, the die member 60 moves into the space previously occupied by the support member 70 and the teeth 62 are disengaged from the hollow rack gear teeth 48. Thus, the die member 60 may be removed from the hollow rack bar.

When the die member 60 is to be removed from the tubular member 50 after the hollow gear teeth 48 have been formed, it is necessary to move the die member inwardly through a distance sufficient to move the crests 106 of the die teeth 62 inwardly of the roots of the hollow rack gear teeth 48. To prevent interference between the die member 60 and the wall of the tubular member 50 as the die member is moved inwardly, the outer side surfaces 86 and 88 of the die member 60 must be spaced from a central plane 109 (FIG. 5) by a distance which is at least one half as great as the height of the die teeth 62. If the outer side surfaces 86 and 88 are closer than this to the plane 109, the side surfaces 86 and 88 will engage the inside surfaces 68 of the tubular member 50 on opposite side of the plane 109 and prevent the die teeth 62 from being moved clear of the rack gear teeth 48.

The hollow rack gear teeth 48 have an outer surface corresponding to the shape of the teeth 96 of the outer die member 92 and an inner surface corresponding to the shape of the teeth 62 of the inner die member 60. The cross sectional shape of teeth 96 on the outer die member 92 is different than the cross sectional shape of teeth 62 on the inner die member 60. However, the two sets of teeth cooperate with each other to press the tubular side wall into the recesses between the teeth. Therefore, the pitch of the teeth 96 on the outer die member 92 substantially correspond to the pitch of the teeth 62.

The wall 54 of the tubular member 50 is continuous and has a uniform radial thickness throughout the length of the tubular member. The teeth 96 and the die member 98 and the teeth 62 on the die member 60 deform the wall 54 in such a manner as to form hollow gear teeth 48 also having a uniform thickness. Therefore, the inner and outer flank surfaces of the teeth are parallel. In addition, the inner and outer crest and root surfaces of the rack gear teeth are parallel. This results in hollow rack gear teeth 48 having crest, flank and root portions of uniform thickness.

Although the teeth 48 on the rack gear are hollow, they are relatively strong and are capable of transmitting substantial loads. Strength is obtained because the gear teeth are an integral part of the tubular wall 54 of the blank 50 and are supported by the remainder of the wall. The tubular wall 54 is continuous, that is a longitudinally extending slot or similar opening is not formed in the wall opposite from the teeth. The absence of such a slot enhances the strength characteristics of the rack gear to enable it to be utilized in environments where relatively heavy loads are applied to the rack gear. Of course, small holes could be drilled or otherwise formed in the side wall of the rack gear without substantially impairing its strength. If desired, the blank 50 could be heat treated either before or after the hollow teeth 48 are formed.

The steering system 20 (FIG. 1) is of the manually actuated type. In order to enhance the responsiveness of the steering system to movement of the steering wheel 44 when the vehicle is to turn a corner and to provide for relatively easy turning of the wheels 22 and 24 during sharp turns encountered in parking a vehicle, the pitch of the teeth 48 of the rack gear 36 varies along the length of the array of teeth. A highly responsive steering system is obtained by providing teeth 48 having spaced crests 110 (FIGS. 7 and 8) adjacent to the center line 112 of the rack gear 36. The relatively wide spacing and resulting large pitch of the teeth 48 near the center of the rack gear 36 provides for a very low gear ratio. Therefore a relatively small arcuate movement of the pinion 40 (FIG. 2) results a relatively large displacement of the rack gear 36. This provides a fast steering response to turning of the steering wheel 44 when the vehicle is proceeding straight ahead and low steering efforts when the steered wheels are turned at a large angle with respect to straight ahead, such as during parking maneuvers.

A low gear ratio steering system is desirable to improve responsiveness of the steering system during turning as the vehicle moves along the road. Conversely, a high gear ratio steering system is desirable during parking. A high gear ratio steering system enables the steered wheels of a stationary or slowly moving vehicle to be easily turned. To facilitate parking, the hollow gear teeth 48 adjacent to the outer ends of the rack gear 36 have crests 110 which are disposed relatively close together thereby resulting in a gear having a relatively small pitch. This provides for a high gear ratio steering system which can be readily turned during parking maneuvers.

Figure 7:
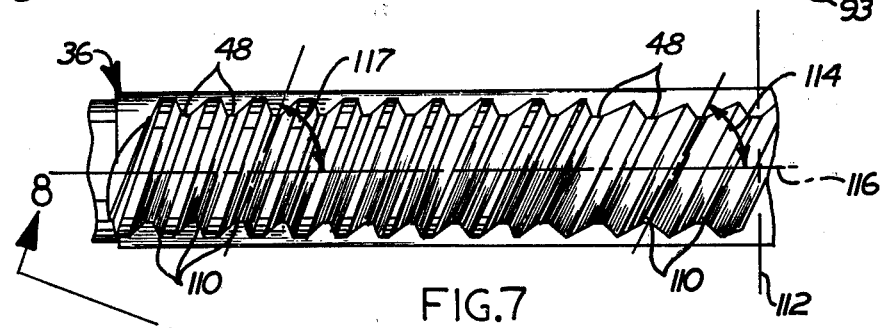
FIG. 7 is a top plan view of a hollow rack gear constructed in accordance with the present invention and having teeth with different pitches to enable the rack gear to be used in a manually actuated variable ratio steering system.
Figure 8:
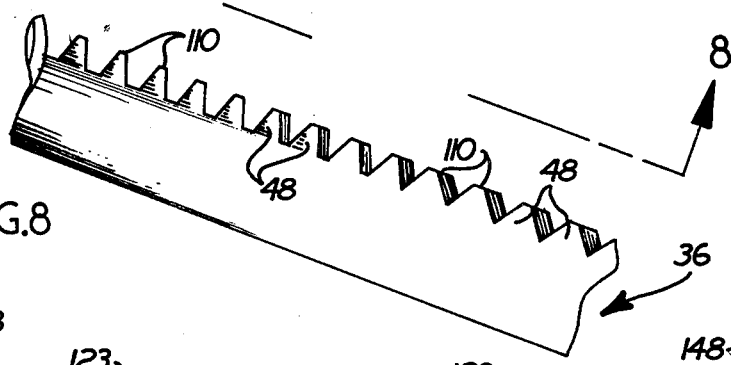
FIG. 8 is an elevation of a tubular bar, taken along the line 8—8 of FIG. 7, illustrating the different pitches of the rack gear teeth.

While one end portion of the rack gear 36 has been illustrated in FIGS. 7 and 8, the gear teeth at the opposite end portion of the rack gear are constructed in the same manner as illustrated in FIGS. 7 and 8, i.e., the teeth are mirror imaged on either side of the central axis of the toothed portion of the rack bar 36. Thus, the array of gear teeth 48 on the rack gear 36 has a pitch which varies along the length of the rack gear. Since the rack gear 36 is to be used in a manually actuated steering system, the gear teeth 48 at the central portion of the rack gear have a relatively large pitch while the gear teeth at the opposite ends of the rack gear have a relatively small pitch.

Obviously, rack gear teeth 48 having a large pitch near the center of the rack gear and a small pitch near the ends of the rack gear requires the teeth on the dies 60 and 92 have pitches which vary along the lengths of the dies. Thus, the teeth 62 on the die 60 have a relatively large pitch at the center of the array of die teeth and a relatively small pitch at the opposite ends of the array of die teeth. Similarly, the teeth 96 on the die 92 have a relatively large pitch at the center of the linear array of die teeth and a relatively small pitch at the opposite ends of the linear array of die teeth.

When the teeth 48 on the rack gear 36 are being formed, the die teeth 62 and 96 having a relatively large pitch cooperate to form teeth 48 having a large pitch at the central portion of the rack gear. Similarly, the die teeth 62 and 96 having a relatively small pitch cooperate to form teeth 48 having a small pitch at opposite ends of the rack gear 36. Due to the variation in pitch gear teeth 48 adjacent to the center of the rack gear 36 have crests which are spaced further apart than the crests of the teeth adjacent to the ends of the gear. In addition, the angle 114 (FIG. 7) between the central axis 116 of the rack gear and the crests of the teeth adjacent to the center of the gear is less than the angle 117 between the axis 116 and the crests of the teeth adjacent to the ends of the gear. Of course if a rack gear having teeth of a uniform pitch and gear tooth spacing was to be formed, the dies 60 and 92 would both have teeth of the same pitch throughout the length of the linear arrays of teeth.

In power assisted steering systems it is desirable to have a relatively high steering ratio when the vehicle is proceeding along the road and a relatively low steering ratio during parking. A power assisted steering system having a low gear ratio over responds to turning movement of the steering wheel as the vehicle is moving along the road. Conversely, during parking a high gear ratio steering assembly is of no benefit since the power assist enables the wheels to be easily turned. Obviously, the pitch of the teeth on the dies 60 and 92 can be selected to fabricate a rack gear to be used in either manually actuated or power assisted steering system.

Figure 9:
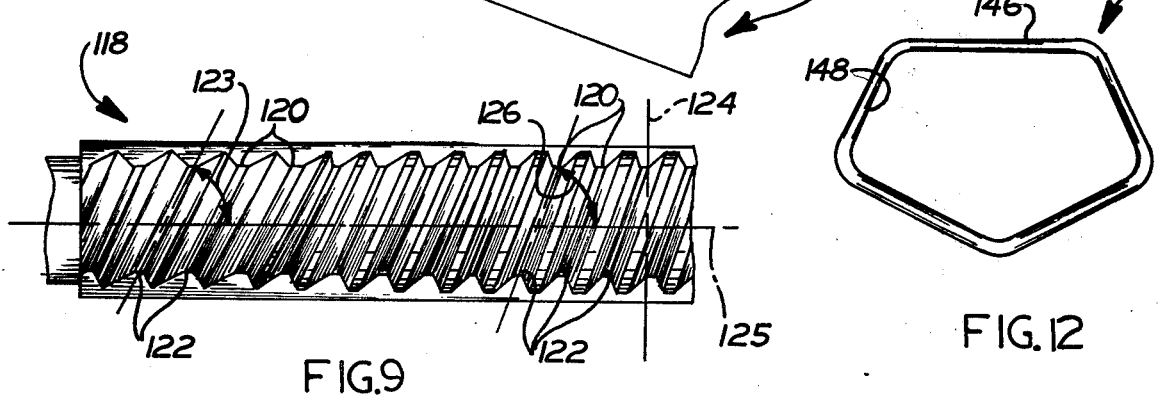
FIG. 9 is a plan view, similar to FIG. 7, of a hollow rack gear for use with a power assisted variable ratio rack and pinion vehicle steering system.

A rack gear 118 constructed in accordance with the present invention and useful in a power steering system, is shown in FIG. 9. Teeth 120 of the rack gear 118 are disposed in an array and have crests 122 which are relatively close together at a central portion of the rack 118. The crests 122 of the teeth 120 are spaced further apart near the opposite ends of the rack gear 118. Thus, the array of teeth 120 on the rack gear 118 has a relatively large pitch adjacent to the ends of the rack gear to provide a relatively low gear ratio for parking maneuvers. The teeth 120 at the central portion of the rack gear 118 have a relatively small pitch to provide a relatively high gear ratio for normal driving and small steering correction. One end portion of the rack gear 118 has been illustrated in FIG. 9, but the gear teeth to the right of a center line 124 of the rack gear 118 have the same shape but in mirror image thereto as the gear teeth disposed to the left of the center line.

Obviously, the dies used to form the teeth 120 of the rack gear 118 would have arrays of teeth with pitches which vary in the same manner as the pitch of the array of teeth 120 on the rack gear 118. Thus the inner and outer dies, corresponding to the dies 60 and 92 of FIG. 6, would have arrays of teeth with a relatively small pitch at the central portion of the dies and a relatively large pitch at opposite ends thereof. In forming the rack gear teeth 120, the die teeth having a large pitch would cooperate to form widely spaced rack gear teeth and the die teeth with a small pitch would cooperate to form closely spaced rack gear teeth. The angle 123 between the crests of the widely spaced gear teeth and the central axis 125 of the rack gear is less than the angle 126 between the crests of the closely spaced gear teeth and the axis 125.

Although the gear teeth 48 and the gear teeth 120 have been illustrated as having straight flank surfaces, it is contemplated that the flank surfaces will be formed with a slightly curving configuration. With variable pitch gearing it has been determined that the flanks of the gear teeth may advantageously curve between opposite ends of the teeth and between the crests and roots of the teeth. It should be understood that the variation in pitch of the rack gear teeth has been exaggerated somewhat in FIGS. 7–9 for purposes of clarity of illustration. Of course, gear teeth having almost any desired configuration and pitch could be formed by utilizing suitable dies.

It may be desirable to use dies of different constructions to facilitate the disengagement of the teeth on the inner die from the teeth of the rack gear. Accordingly, two different die assemblies have been illustrated in FIGS. 10 and 11. Since the die assemblies associated with FIGS. 10 and 11 are generally similar to the die assemblies associated with FIGS. 4–6, similar numerals have been utilized to designate similar components, the suffix letter "a" being associated with FIG. 10 and the suffix letter "b" being associated with FIG. 11 to avoid confusion.

The die assembly 58a of FIG. 10 includes an upper or inner die 60a having three parts, a central longitudinally extending part 128 and a pair of longitudinally extending side parts 130 and 132. The three pieces 128, 130 and 132 of the die 60a have teeth formed therein in the same manner as described in connection with the die 60. However by making the die in three separate pieces, the pieces can be more readily disengaged from the teeth on a rack gear after a support member 70a has been removed from the tubular member 50a.

In the FIG. 11 embodiment, the inner die 60b has an arcuate bottom portion 138 which cooperates with a similarly shaped longitudinally extending recess 140 in a support member 70b. By forming the die 60b with the arcuate bottom portion 138, the strength of the die 60b is increased. The inner die 60b has teeth similar to the teeth 62 on the rack gear 60 of FIG. 4. Disengagement of the teeth on the inner die 60b from the rack gear teeth, requires withdrawal of the support member 70b axially from the tubular member 50b. Thereafter the inner die 60b is moved downwardly (as viewed in FIG. 11) to disengage the teeth on the die from the rack gear teeth.

Figure 12:
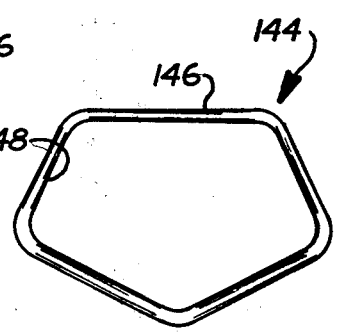
FIG. 12 (on the third sheet of drawings) is a sectional view of a tubular member in which hollow rack gear teeth may be formed in accordance with the method of the present invention.

Although the various dies have been described for use with a tubular member having a cylindrical configuration, it is understood that tubular members having any peripheral wall shape could be used. For example, a pentagonal tubular member 144 (FIG. 12) may be advantageous. Tubular member 144 has a flat longitudinally extending side section 146 in which gear teeth are to be formed by suitably shaped dies corresponding to the outer die 92 and the inner die 60 of FIG. 4. Of course, the inner die assembly would be formed to have an exterior configuration corresponding to the configuration of the continuous inner surface 148 of the tubular member 144. In addition, the inner die assembly would have a pair of parts including a member corresponding to the die member 60 of FIG. 4 and a support member corresponding to the support member 70 of FIG. 4 to allow the support member to be withdrawn and the teeth on the inner die member disengaged from the rack gear teeth.

Figure 13:
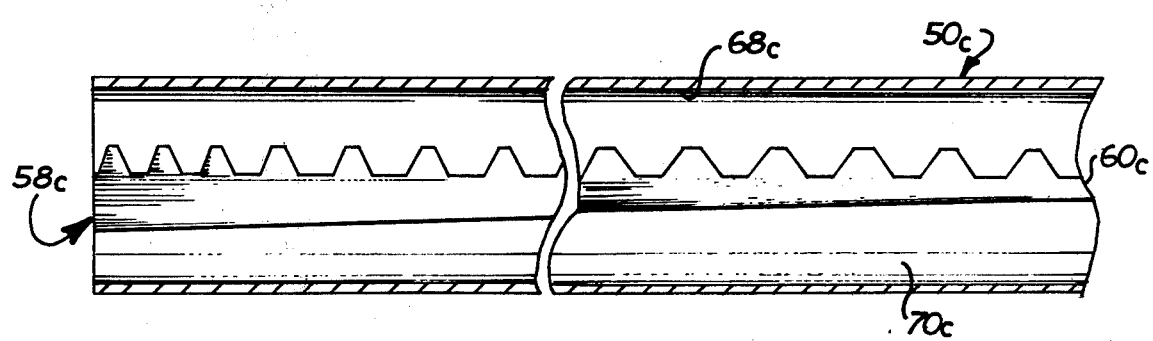
FIG. 13 is a partial sectional view (similar to FIG. 4) illustrating another embodiment of a die assembly which may be used to form the rack gears.

Due to the dimensional tolerances with which the tubular member 50 is formed, the outside diameter of the die assembly 58 may be slightly smaller than the inside diameter of the inner surface 68 of the tubular member. When this happens, the support member 70 is ineffective to hold the arcuate outer side surfaces 86 and 88 of the inner die 62 (see FIG. 5) in firm abutting engagement with the inside surface 68 of the tubular member. To provide for firm abutting engagement between the arcuate side surface areas 86 and 88 of the inner die 60 and the inner surface of the tubular member 50, the inner die and its support member are longitudinally tapered to wedge the inner die against the inside surface 68 of the member 50. A die assembly having a longitudinally tapered support member and inner die is illustrated in FIG. 13. Since the construction of the die assembly shown in FIG. 13 is substantially the same as the construction of the die assembly 58, similar numerals will be utilized to designate similar components, the suffix letter "c" being associated with FIG. 13 to avoid confusion.

The die assembly 58c includes an inner die 60c and a support member 70c. The support member 70c tapers from a relatively small cross sectional configuration adjacent to the left end of the support member (as viewed in FIG. 13) to a relatively large cross sectional configuration at the right end of the support member. Similarly, the inner die 60c tapers from a relatively small cross sectional configuration adjacent to the right end of the die (as viewed in FIG. 13) to a relatively large cross sectional configuration adjacent to the left end of the die. The tapered configurations of the support member 70c and die 60c results in a wedging action between the support member and die to press arcuate side surfaces of the inner die firmly against the inner surface 68c of a tubular member 50c. When the die assembly 58c is to be positioned in the tubular member 50c, the inner die 60c if first inserted into and aligned with the axial ends of the tubular member. The support member 70c is then inserted from the right end (as viewed in FIG. 13) of the tubular member 50c. As the inner die 60c moves into the tubular member 50c, the bottom surface of the inner die cooperates with the top surface of the support member to force the inner die 60c upwardly (as viewed in FIG. 13) to press the inner die 60c firmly against the inner side surface 68c of the tubular member 50c.

From of the foregoing, it should be apparent that the present invention provides a relatively lightweight strong rack gear 36 having hollow teeth 48. The rack gear 36 is formed by using dies 60 and 92 to form hollow gear teeth 48 in the side wall 54 of a tubular member 50. Although the hollow rack gear 36 could be used in many applications, it is advantageous to use the hollow rack gear in a vehicle steering system 20 to obtain a substantial reduction in the mass of the rack gear bar used in the steering system. Additionally, the hollow rack gear can be made with teeth having any number of different pitches. Hence, the rack gear can be used in variable ratio vehicle steering systems of either the manual or the power assisted type.

Having described some embodiments of my invention, I hereby claim:

1. An apparatus for turning steerable vehicle wheels, said apparatus comprising a pinion adapted to be connected with and rotated in response to rotation of a manually actuatable member, and a hollow rack gear disposed in meshing engagement with said pinion and adapted to be connected with the steerable vehicle wheels, said rack gear including a hollow tubular member having a longitudinally extending side wall in which a plurality of hollow teeth are formed, said side wall being continuous and free of joints in a plane extending transversely to the central axis of the tubular member throughout the length of a portion of the tubular member in which the hollow gear teeth are formed.

2. An apparatus as set forth in claim 1 wherein said hollow rack gear teeth include a first plurality of teeth having crests spaced a first distance apart and a second plurality of teeth having crests spaced a second distance apart, said first distance being greater than said second distance.

3. An apparatus as set forth in claim 1 wherein said hollow rack gear teeth include a first plurality of teeth having crests extending at a first angle to a longitudinal central axis of said hollow tubular member and a second plurality of teeth having crests extending at a second angle to a longitudinal central axis of said hollow tubular member, said first angle being greater than said second angle.

4. An apparatus as set forth in claim 1 wherein said hollow gear teeth have crests, flank and root portions of uniform thickness and formed by the wall of said hollow tubular member.

5. A method of making a rack gear having hollow teeth, said method comprising the steps of providing a tubular member having an open end and a longitudinally extending side wall with inner and outer surfaces which are continuous in a plane extending transversely to the longitudinal axis of the tubular member, providing a first longitudinally extending die having projections and recesses therebetween with configurations corresponding to the configuration of the inner surfaces of the hollow teeth of the rack gear, moving at least a portion of the first die into the tubular member through the open end of the tubular member to position at least a portion of the projections on the first die adjacent to the longitudinally extending inner surface of the tubular member, providing a second die having projections and recesses therebetween with configurations corresponding to the configuration of the outer surfaces of the hollow teeth of the rack gear, positioning the second die adjacent to the longitudinally extending outer surface of the tubular member with the projections on the second die aligned with the recesses on the first die, simultaneously forming a plurality of hollow gear teeth in the side wall of the tubular member by effecting relative movement between the first and second dies and pressing the side wall of the tubular member into the recesses between the projections on the first die with the projections on the second die and pressing the side wall of the tubular member into the recesses between the projections on the second die with the projections on the first die to form the hollow gear teeth, and removing the first die from the tubular member.

6. A method as set forth in claim 5 further including providing a support member having first and second longtiudinally extending side surfaces disposed on opposite sides of the support member, moving at least a portion of said support member through the open end of the tubular member, engaging a side surface of the first die at a location opposite the projections on the first die with the first longitudinally extending side surface of the support member, engaging a portion of the inner surface of the tubular member with the second longitudinally extending side surface of the support member, and engaging the outside surface of the tubular member at a location directly opposed to the portion of the inner surface of the tubular member engaged by the second longitudinally extending side surface of the support member.

7. A method as set forth in claim 6 further including the step of providing a wedging action between the first die and the support member to press the first die against the inner surface of the tubular member.

8. A method as set forth in claim 6 wherein said step of removing the first die from the tubular member includes removing the support member from the tubular member and then moving the first die away from the hollow gear teeth and into at least a portion of the space previously occupied by the support member.

9. A method as set forth in claim 8 wherein said step of moving the first die away from the hollow gear teeth includes the step of moving the die through a distance which is at least as great as the height of the projections on the first die to disengage the projections on the first die from the hollow gear teeth.

10. A method of making a rack gear for use in a variable ratio steering system, said method comprising the steps of providing a longitudinally extending wall with first and second side surfaces, providing a first longitudinally extending die having a first series of teeth with at least two different pitches, positioning the first series of die teeth adjacent to the first side surface of the wall, providing a second longitudinally extending die having a second series of teeth with at least two different pitches, positioning the second series of die teeth adjacent to the second side surface of the side wall, forming in the wall a series of hollow gear teeth having at least two different pitches, by pressing the wall of the longitudinally extending member into recesses between the teeth on the first die with the crests of the teeth on the second die.

11. A method as set forth in claim 10 wherein said step of forming a series of hollow gear teeth includes forming a first plurality of hollow gear teeth having a first pitch at a central portion of the series of hollow gear teeth and forming a second plurality of hollow gear teeth having a second pitch at a location which is offset to one side of the central portion of the series of hollow gear teeth.

12. A method as set forth in claim 10 wherein said step of providing a longitudinally extending wall includes the step of providing a tubular member having an open end, said step of positioning the teeth on the first die adjacent to the first side surface of the wall includes the steps of moving at least a portion of the first die into the tubular member through the open end of the tubular member.

13. A method as set forth in claim 10 further including the step of providing a support member, engaging the first die with the support member, and transmitting force from the support member to the first die to press the first die against the longitudinally extending wall.

14. A method as set forth in claim 10 wherein said step of providing a longitudinally extending wall includes the step of providing a tubular member, said step of positioning the teeth on the first die adjacent to the first side surfaces of the wall includes the step of positioning at least a portion of the first die in the tubular member, said method further including the step of rmoving the first die from the tubular member after forming the series of hollow gear teeth, said step or removing the first die including the step of moving the first die sidewardly away from the series of hollow gear teeth through a distance which is at least as great as the distance between the roots and crests of the first series of teeth.

15. A method of making a rack gear for use in a variable ratio steering system, said method comprising the steps of providing a longitudinally extending metal member having a longitudinally extending side wall with first and second side surfaces, providing a first longitudinally extending die having a series of teeth disposed in a first linear array which includes a first plurality of teeth having a first pitch and a second plurality of teeth having a second pitch which is greater than the first pitch, positioning the linear array of teeth on the first die adjacent to the first side surface of the side wall, providing a second longitudinally extending die having a series of teeth disposed in a second linear array which includes a third plurality of teeth having a pitch which is the same as the pitch of the first plurality of teeth on the first die and a fourth plurality of teeth having a pitch which is the same as the pitch of the second plurality of teeth on the first die, positioning the second linear array of teeth on the second die adjacent to the second side surface of the side wall, said step of positioning the second linear array of teeth including positioning the crests of the third plurality of teeth in alignment with recesses between the teeth of the first plurality of teeth and positioning the crests of the fourth plurality of teeth in alignment with recesses between the teeth of the second plurality of teeth, forming a linear array of hollow gear teeth having a plurality of pitches in the side wall of the longitudinally extending member, said step of forming a linear array of hollow gear teeth including the step of forming a first plurality of hollow gear teeth having a pitch equal to the first pitch by pressing the side wall of the longitudinally extending member into the recesses between the first plurality of teeth on the first die with the crests of the third plurality of teeth on the second die and pressing the side wall of the longitudinally extending member into the recesses between the third plurality of teeth on the second die with the crests of the first plurality of teeth on the first die, said step of forming a linear array of hollow gear teeth further includes the step of forming a second plurality of hollow gear teeth having a pitch equal to the second pitch by pressing the side wall of the longitudinally extending member into the recesses between the second plurality of teeth on the first die with the crests of the fourth plurality of teeth on the second die and pressing the side wall of the longitudinally extending member into the recesses between the fourth plurality of teeth on the second die with the crests of the second plurality of teeth on the first die.

16. A method as set forth in claim 15 wherein said step of forming a first plurality of hollow gear teeth having a pitch equal to the first pitch includes forming the first plurality of hollow gear teeth at a central portion of the linear array of hollow gear teeth, said step of forming a second plurality of hollow gear teeth having a teeth pitch equal to the second pitch includes forming the second plurality of hollow gear teeth at a location which is offset to one side of the central portion of the linear array of hollow gear teeth.

17. A method as set forth in claim 15 wherein said step of forming a second plurality of hollow gear teeth having a pitch equal to the second pitch includes forming the second plurality of hollow gear teeth at a central portion of the linear array of hollow gear teeth, said step of forming a first plurality of hollow gear teeth having a pitch equal to the first pitch includes forming the first plurality of hollow gear teeth at a location which is offset to one side of the center portion of the linear array of hollow gear teeth.

18. A method as set forth in claim 15 wherein said step of providing a longitudinally extending metal member includes the step of providing a tubular member having an open end, said step of positioning the linear array of teeth on the first die adjacent to the first side surface of the side wall including the steps of moving at least a portion of the first die into the tubular member through the open end of the tubular member to position the first and second pluralities of teeth adjacent to the inner surface of the tubular member.

19. A method of making a rack gear having hollow teeth, said method comprising the steps of providing a tubular member having a longitudinally extending central axis, providing a first die having a first series of teeth, positioning at least a portion of the first series of teeth on the first die in the tubular member, providing a second die having a second series of teeth, positioning the second die adjacent to the tubular member with the crests of the second series of teeth aligned with the roots of the first series of teeth, forming hollow gear teeth by pressing the wall of the tubular member toward the roots of the first series of teeth with the crests of the second series of teeth and by pressing the wall of the tubular member toward the roots of the second series of teeth with the crest of the first series of teeth, and removing the first die from the tubular member after forming the hollow gear teeth, said step of removing the first die including moving the first die transversely to the central axis of the tubular member through a distance sufficient to move the crests of the first series of teeth inwardly of the roots of the hollow gear teeth and then removing the first die along the central axis of the tubular member.

20. A method as set forth in claim 19 further including providing a support member, positioning at least a portion of said support member in the tubular member between a wall of the tubular member and a side surface of the first die at a location opposite the first series of teeth, and providing a wedging action between the first die and the support member to press the first die against the tubular member.

21. A method as set forth in claim 20 wherein said step of removing the first die from the tubular member includes removing the support member from the tubular member and then performing said step of moving the first die transversely to the central axis of the tubular member by moving the first die into at least a portion of the space previously occupied by the support member.

* * * * *

UNITED STATES PATENT AND TRADEMARK OFFICE
CERTIFICATE OF CORRECTION

PATENT NO. : 4,133,221

DATED : January 9, 1979

INVENTOR(S) : Harry Earl Clary

It is certified that error appears in the above-identified patent and that said Letters Patent are hereby corrected as shown below:

Column 11, line 3, change "rmoving" to --removing--.

Column 12, line 47, change "removing" to --moving--.

Signed and Sealed this

Third Day of July 1979

[SEAL]

Attest:

Attesting Officer

LUTRELLE F. PARKER
Acting Commissioner of Patents and Trademarks